Oct. 20, 1970     H. J. TRAVIS     3,535,236

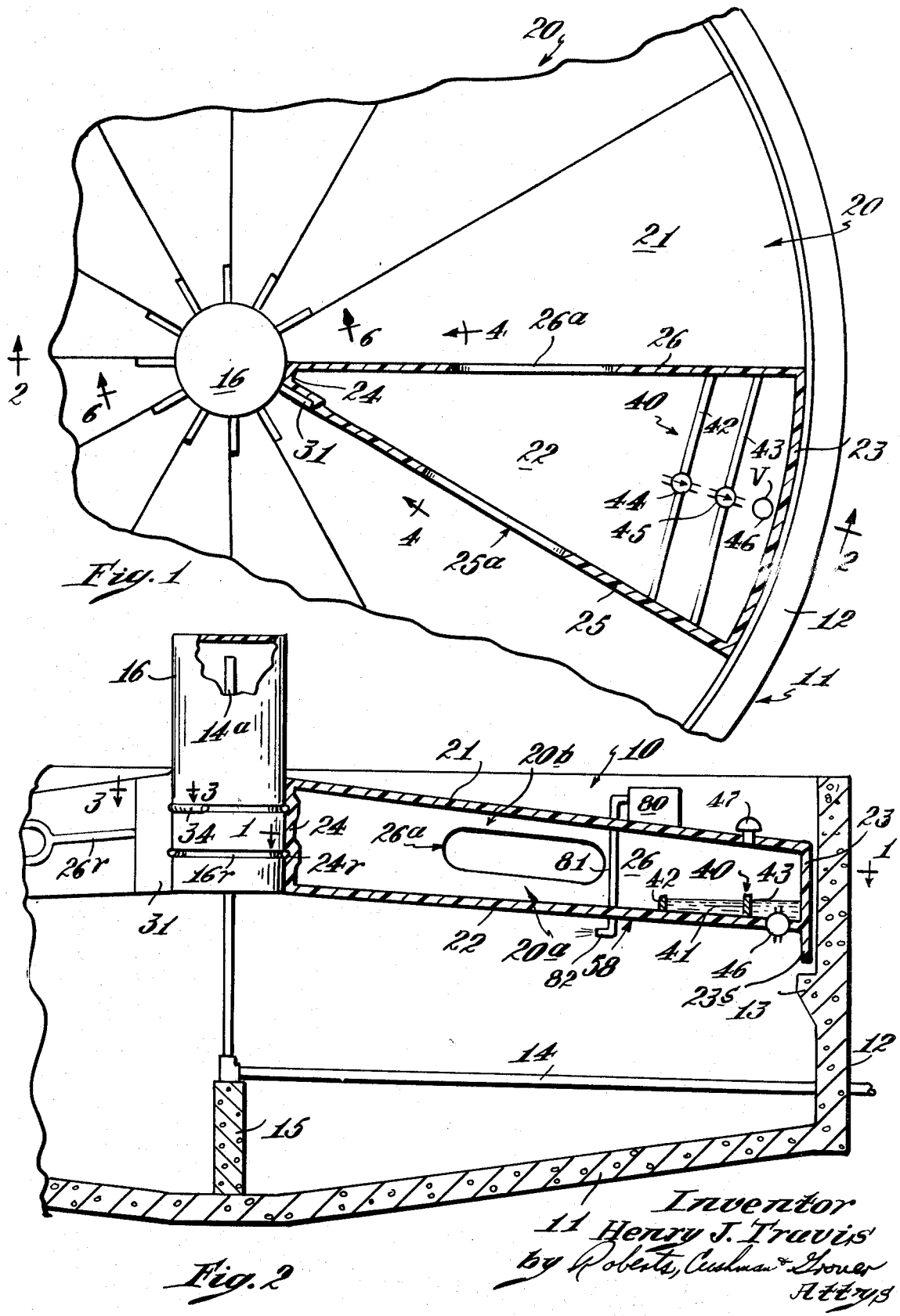

FLOATING COVER

Filed May 11, 1967     3 Sheets-Sheet 2

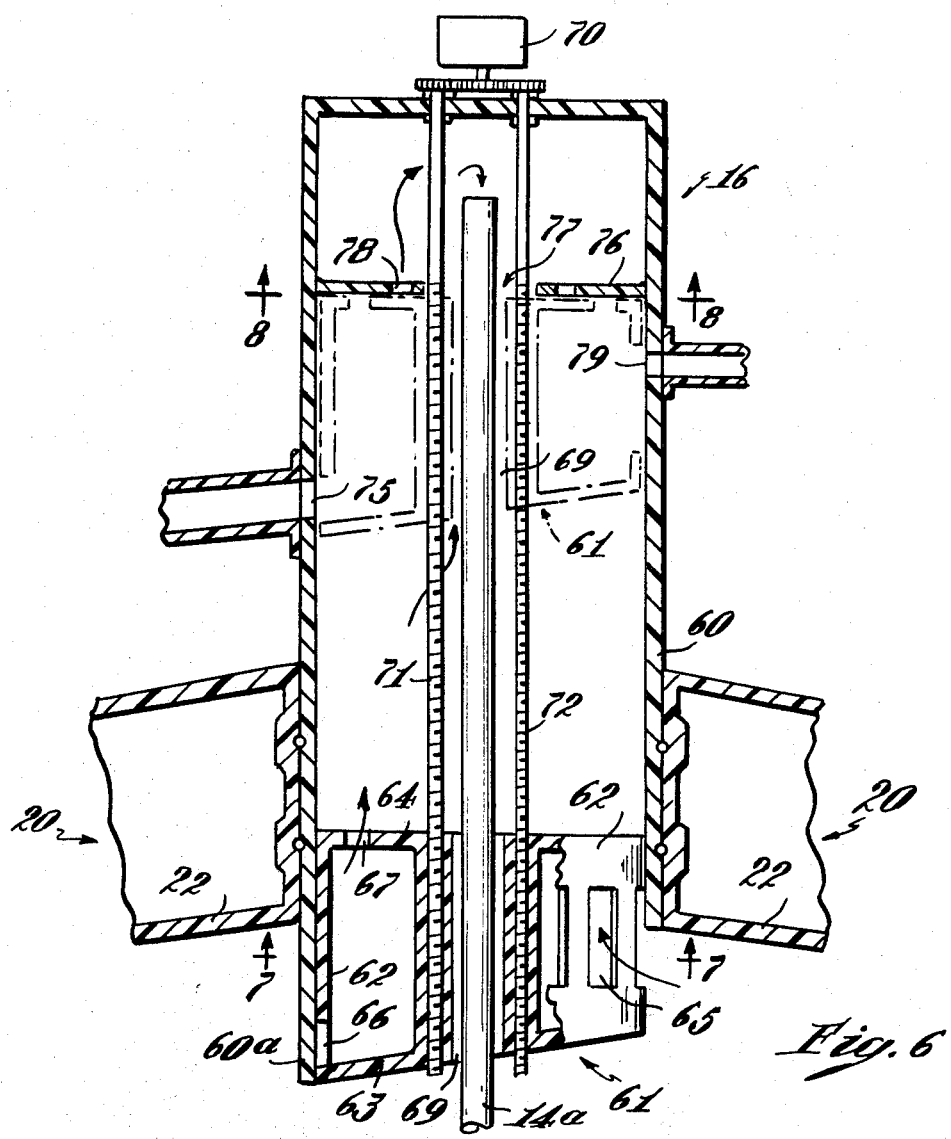

United States Patent Office 3,535,236
Patented Oct. 20, 1970

3,535,236
FLOATING COVER
Henry J. Travis, 810 N. Main St.,
Fall River, Mass. 02726
Int. Cl. B01d 19/00
U.S. Cl. 210—136                                14 Claims

ABSTRACT OF THE DISCLOSURE

A sludge digester floating cover formed of a plurality of hollow, wedge-shaped sections joined together and to a central gas dome; the floating cover has a liquid ballast system with independent liquid-holding compartments in the hollow shells and pump and conduit means to supply liquid to, and to transfer liquid between, the compartments; a bottom wall inclining upwardly toward the gas dome with centrally extending tapering channels to promote flow of scum and gas toward the gas dome; and a hopper at the gas dome to collect scum for removal from the digester.

BACKGROUND OF THE INVENTION

The invention pertains to the field of floating covers for liquid-holding tanks, and more particularly to covers for gas-liberating digesters used to treat sewage solids.

In sewage treatment plants a semi-liquid mass called sludge is removed from the liquid flow of sewage and placed in a digester tank, where anaerobic decomposition of organic matter results in partial gasification, liquefaction, and mineralization. Digestion produces sludge-gas, comprising 60–70% methane and 20–30% carbon dioxide with minor amounts of impurities such as hydrogen sulphide. This gas has a fuel value and is often used at the sewage treatment plant to operate auxiliary engines and to provide heat for sludge-heating systems. Unused gas is burned, as its free liberation into the atmosphere would create a dangerously explosive mixture. During operation of the digester fresh solids are added and liquefied materials and digested solids are removed, thus causing the tank level to rise and fall. Scum, comprising slowly digestible or non-digestible materials, rises to the top of the tank. To uniformly collect gas with the rising and falling of the tank level, and to help immerse scum in the digester liquid where it can be better digested, floating covers have been devised.

Floating covers now in use are steel. They are prefabricated completely at a factory, then disassembled for transportation to the digester site, fully reassembled near the digester tank, and moved by a crane for positioning in the tank. To control formation of scum, resort has been made to gas or liquid recirculation methods or mechanical stirring. To provide sufficient gas pressure within the tank, the cover is weighted or ballasted with a large number of one hundred pound concrete weights.

The aforesaid measures are unsatisfactory in several respects. Manufacture and assembly are difficult, time-consuming, and expensive. The covers must have a high degree of structural strength so that the cover and several tons of ballast can be supported without failure on a landing ledge or landing brackets when the tank contents fall below a prescribed level. Scum still forms to a depth of several feet, reducing the working capacity of the tank and impeding liberation of gas. Snow accumulating on the cover causes gas pressure to increase. Non-uniform snow deposition or scum buildup causes the cover to tilt.

SUMMARY OF THE INVENTION

Objects of the present invention are to provide an easily and inexpensively constructed and assembled floating cover; to provide a floating cover requiring less structural strength than heretofore necessary; to provide a floating cover in which buoyancy changes or tilting caused by snow loading or scum formation can be compensated simply; to produce a floating cover in which gas is easily and positively collected; and to provide a floating cover in which scum can be positively and effectively controlled.

According to the invention a floating cover comprises, in one aspect, a plurality of substantially wedge-shaped hollow shells disposed radially in the tank and joined together rigidly, each shell comprising: a substantially sector-shaped top wall; a substantially sector-shaped bottom wall; an outer wall conforming to the shape of the tank and connecting with said top and bottom walls; and side walls connecting with said top, bottom, and outer walls and adapted for attachment to the side walls of adjacent shells; the walls of said shell forming a lower buoyant portion enabling the shell to float independently, and an upper buoyant portion to trap air and enable said cover to float when the shells are flooded with liquid. In another aspect, the floating cover comprises separate liquid-holding compartments offset from the center of said cover, and means for transferring liquid to and from said compartments, whereby the cover may be ballasted with liquid in said compartments, and whereby liquid ballast may be transferred among said compartments to level said cover. In other aspects the floating cover has a gas dome in a central region thereof to which said shells are attached, and the bottom walls of said shells form a plurality of tapering channels extending centrally toward the gas dome to promote flow of gas and scum to the gas dome, the gas dome having an elevatable hopper mounted therein for collecting scum and for removing collected scum from the tank.

Other and further novel features and advantages will be apparent from the following description of specific embodiments shown in the accompanying drawings.

DESCRIPTION OF THE DRAWINGS

FIG. 1 is a partial plan view with one shell in section as on line 1—1 of FIG. 2;

FIG. 2 is a section on line 2—2 of FIG. 1;

FIG. 6 is a section to increased scale on line 6—6 of FIG. 1;

FIG. 7 is a section on line 7—7 of FIG. 6; and

FIG. 8 is a section on line 8—8 of FIG. 6.

DESCRIPTION OF THE PREFERRED EMBODIMENTS

Figures 3, 4:
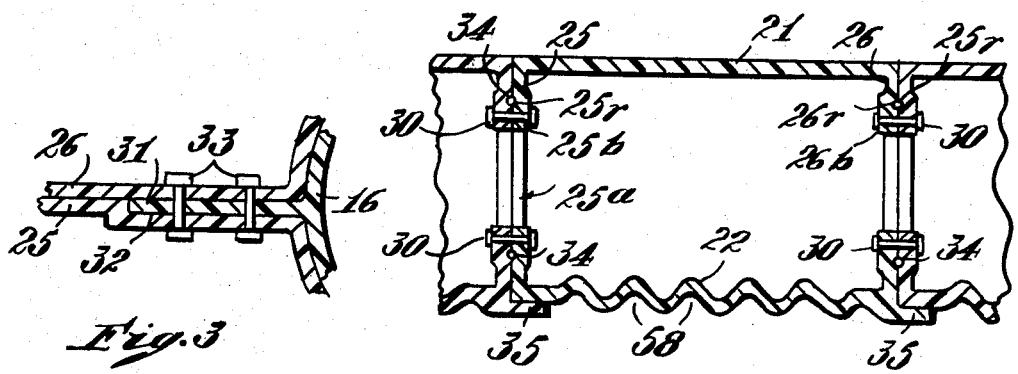
FIG. 3 is a section to increased scale on line 3—3 of FIG. 2.
FIG. 4 is a section to increased scale on line 4—4 of FIG. 1.

A floating cover 10 according to the invention is shown in FIGS. 1 and 2 disposed within a conventional digester tank 11 having a vertical cylindrical side wall 12, a landing ledge 13 extending from the side wall, and a fixed gas conduit 14 with a vertical portion 14a supported on a pillar 15 rising from the bottom of tank 11. The cover 10 comprises a plurality, here 12, of hollow, wedge-shaped shells 20 which are disposed radially in the tank 11 and joined as hereinafter described to one another and to a centrally located cylindrical gas dome 16.

As shown in FIGS. 1 and 2, each of the shells 20 comprises a substantially sector-shaped top wall 21 including downwardly toward the tank wall 12 so that rain will drain from the cover; a substantially sector-shaped bottom wall 22 inclining upwardly toward the gas dome 16 to direct gas to the gas dome for collection; an outer wall 23 conforming to the shape of the tank wall 12; a gas skirt 23s extending beneath bottom wall 22 in the plane of outer wall 23; an inner wall 24 conforming to the shape of the gas dome; and side walls 25 and 26 adapted to be attached to similar side walls in adjacent shells 20. The top, bottom, inner, outer, and side walls and gas skirt are connected together securely, and preferably are formed of molded Fiberglas for resistance to the corrosive materials in the tank and to enable repairs and modifications to be easily made without danger from sparks. In large diameter covers, the shells 20 can be provided with additional strength through bracing and ribbing of conventional design (not shown).

A conventional access manhole (not shown) is provided in one or more top walls 21. Side walls 25 and 26 are provided with apertures 25a and 26a which grant passage between shells to workmen within the cover. Apertures 25a and 26a are located, as shown in FIGS. 2 and 4, far enough from top wall 21 and bottom wall 22 so that each shell 20 has a lower buoyant portion 20a enabling the shell to float independently when placed on liquid, and an upper buoyant portion 20b which will trap air and enable the cover 10 to float even when flooded with liquid.

The shells 20 are connected to one another with, for example, bolts 30 such as are shown in FIG. 4, joining reinforced portions 25b and 26b of adjacent side walls 25 and 26. The number and location of bolts 30 are arranged, according to the size of the cover, so that the cover can withstand the stresses to which it is subjected. In some cases, it is contemplated that shells 20 will be joined together with suitable adhesive. The shells 20 are connected to the gas dome 16 by means of fins 31 formed on the gas dome which fit in recesses 32 provided in side walls 25 and which are secured to adjacent side walls 25 and 26 with bolts 33 (FIG. 3). To prevent gas from leaking through the cover where the shells are joined together and to the gas dome, gasket material 34 is provided in recesses 24r, 25r, 26r, and 16r formed in the inner wall 24, sidewalls 25 and 26, and gas dome 16, respectively.

The top, bottom, side, inner and outer walls of each shells are preferably molded of Fiberglas. The shells can be easily manufactured individually on a single mold, transported to the tank location individually, and easily assembled. To assemble the floating cover 10, the tank 11 is filled with water and individual shells 20 are placed thereon and floated into position for connection with other shells and with the gas dome. To facilitate alignment of the shells during assembly, each is provided with a lip 35 formed at the intersection of bottom wall 22 and a side wall, such as 26. The lip 35 further serve to prevent scum from entering between the side walls 25 and 26 of adjacent shells.

After assembly, the floating cover is weighted to establish a sufficient pressure for collection of gas, a typical pressure being 8¾ inches of water. According to the invention, the floating cover is weighted, or ballasted, with liquid, such as water, which is inexpensively supplied. Because the bottom wall 22 of each shell inclines upwardly toward a central region of the cover, liquid-holding compartments 40 are formed by the bottom wall 22, outer wall 23, and side walls 25 and 26 in each shell near the outer periphery of the cover. A liquid 41, preferably water, is placed in at least some of the compartments 40 to give the cover weight. The amount of water or other liquid which must be used to provide a given pressure will depend, of course, on the size of the cover and the weight of the shells 20 and gas dome 16. However, as hereafter explained, the liquid 41 can be easily added or removed to supply the proper pressure. As shown in FIGS. 1 and 2, the liquid-holding compartments 40 have baffle plates 42 and 43 therein secured to the side walls 25 and 26 and bottom wall 22 to restrict flow of liquid 41. Check valves 44 and 45 are provided at the bottoms of the baffle plates to permit any liquid in the shells to drain to the lowest part of liquid-holding compartment 40. Disposed in bottom wall 22 near the lowest part of liquid-holding compartment 40, is a valve 46.

When the level of liquid in tank 11 falls, the floating cover will be lowered until its gas skirt 23s rests on landing ledge 13 in tank 11. The floating cover will then no longer be buoyed by the tank contents and will be subject to greatest stress. As the tank contents fall, valve 46 may be opened to purge or void liquid 41 from liquid-holding compartments 40 into the tank. Valve 46 can be manually operated, but preferably is of the type automatically controlled by a pressure differential. A vent or valve 47 is provided in top wall 21 to admit air into the shells to replace liquid 41 purged from the cover. Vent or valve 47 is preferably located so that it will not release air entrapped in the upper buoyant portions 20b of the shells.

Because liquid ballast 41 can be so easily emptied, the cover 10 can be constructed to omit provision for structural strength necessary to support ballast in cases where the cover rests unsupported by the buoyant tank contents. Lighter and cheaper construction is therefore possible.

Figure 5:
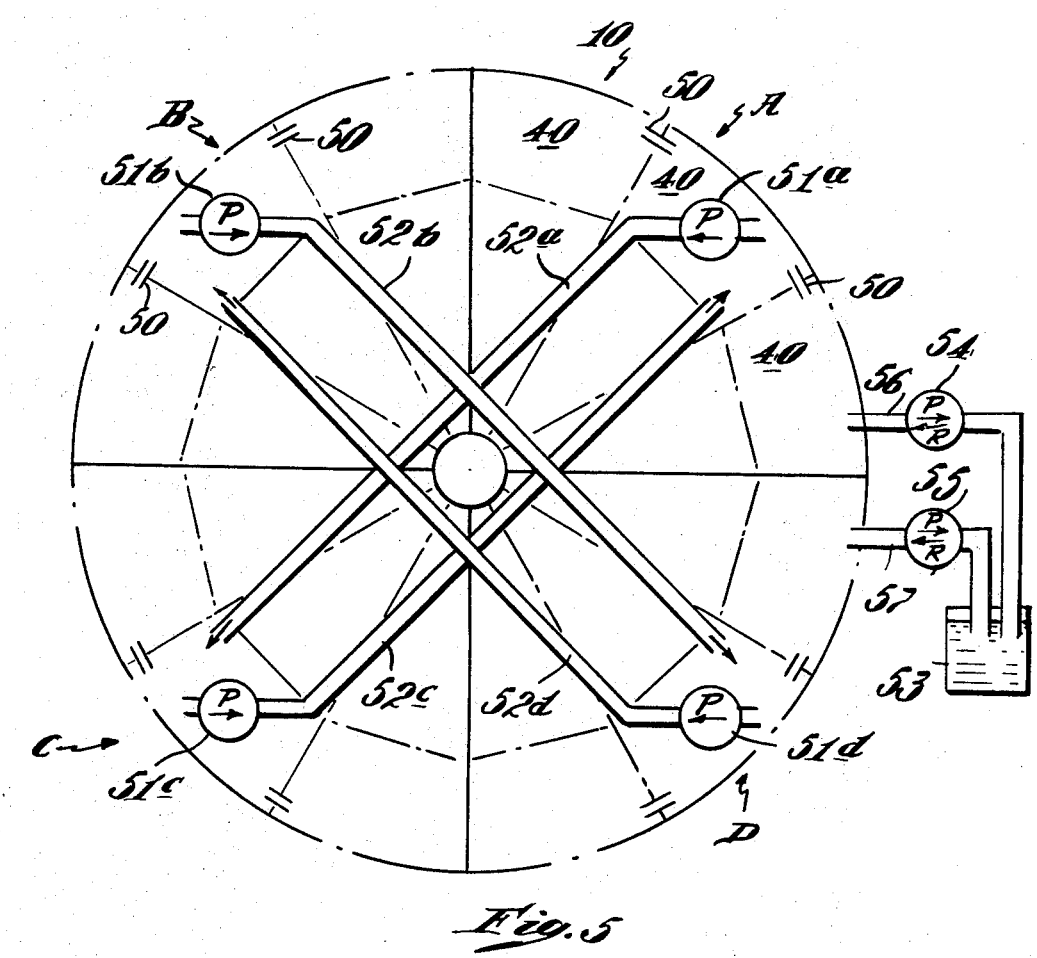
FIG. 5 is a schematic diagram of a provision for pump and conduit means in the floating cover.

To trim and level the cover, and to supply and remove ballast, a pumping system such as is shown diagrammatically in FIG. 5 is used. As shown, the liquid-holding compartments 40 of each quadrant A, B, C, and D of the cover are interconnected by conduits 50. Each quadrant has means including a pump 51a, 51b, 51c, or 51d and a conduit 52a, 52b, 52c, or 52d for transferring liquid ballast to the opposite quadrant's liquid-holding compartments. The conduits 52a–d can be run through apertures 25a and 26a, or they can be incorporated in the cover during molding. By suitable operation of the pumps, liquid ballast can be transferred to counteract non-uniform snow loading or scum buildup to keep the cover level.

To adjust gas pressure, to compensate for weight of snow, or to purge when buoyancy is lost, ballast can be supplied from or removed to an external source 53 of liquid 41 by reversible pumps 54 and 55, and conduits 56 and 57 communicating with adjacent quadrants of the cover, such as A and D. Ballast supplied by pumps 54 and 55 is transferred by pumps 51a and 51d for levelling.

Other means for transferring ballast to and from the cover, and among liquid-holding compartments 40 in the cover, can be used successfully. For example, pumps 51a and 51c, and conduits 52a and 52c, could be replaced with a single reversible pump and a single conduit extending between opposite quadrants A and C. For another example, the floating cover could be divided into thirds, and a single pump connectable to conduits extending to any two of the thirds could be used to transfer ballast. For another example, each quadrant of the cover could be serviced by a reversible pump communicating with an external reservoir of liquid. For another example, only four liquid holding compartments 40 could be used to hold ballast, the other compartments remaining empty. For greatest convenience of operation, it is preferable that the pumps used to transfer ballast to and from liquid-holding compartments 40 be automatically controlled, as by switches sensitive to tilting of the cover, or switches sensitive to the level of liquid in the liquid-holding compartments, or switches sensitive to levels of gas pressure.

The provision of liquid ballast 41 and a pumping system in the floating cover lends itself to additional uses. For example, by directing conduits 52a–d through a refrigerator, and operating pumps 51a–d to continuously recirculate liquid 41, it is possible to cool bottom wall 22 to condense moisture from gases liberated in the tank.

Gas liberated within the digester tank 11 rises until it meets the inclined bottom walls 22 of the floating cover. The gas then travels centrally to the gas dome 16, and exits from the gas dome through the open upper end of pipe 14a. To promote travel of gas and scum to the gas dome, the bottom walls 22 are rippled or corrugated to form a plurality of channels 58 therein extending between the gas skirt 23s and gas dome 16 (FIG. 4). Gas rising in the tank flows into the channels 58 and is directed inwardly toward the gas dome, maintaining the channels substantially clear of scum floating at the top of the digester tank. Channels 58 by helping to maintain free paths for the gas, enable gas to be collected at a higher rate. It is believed that the channels, by confining the flow of gas to a smaller volume, increase the force of its flow to an extent sufficient to prevent scum from blocking the passages. Processes used to stimulate digestion, such as gas or liquid injection or recirculation, or mechanical stirring, will benefit by the improved collection of gas provided by channels 58, and also by the attendant increased flow of scum caused by faster collection of gas.

The channels 58 are dimensioned so that they are widest and deepest at the outer periphery of the cover, and narrowest and shallowest at the edge of the gas dome. Preferably channels 58 extend radially from the gas dome. The number and dimensions of the channels can vary, of course, with the size of the floating cover and the material being digested.

As gas flows inwardly to the gas dome along channels 58, it carries floating scum with it. FIGS. 6 to 8 illustrate apparatus for removing the scum which accumulates at the gas dome. As illustrated, the gas dome 16 has a vertical cylindrical side wall 60. Slidable in the gas dome wall 60 is a hopper 61 which has an outer wall 62 mating with the gas dome wall 60 and connecting with an inclined bottom wall 63 and a top wall 64. The hopper outer wall 62 is provided with apertures 65 which permit scum and gas to enter the hopper in its loading position, and which are sealed by the gas dome wall 60 when the hopper is raised. The outer wall 62 is also provided with a discharge aperture 66 located near the lowest part of the bottom wall 63. A portion 60a of the gas dome wall extends downwardly to cover discharge aperture 66 when the hopper 61 is in its lowered, loading position shown in FIG. 7 in solid lines. The top wall 64 of the hopper is provided with apertures 67 which permit gas to flow upwardly through the hopper. The hopper also has an inner wall 68 encircling the gas pipe 14a and spaced therefrom to provide a gas passage 69 bypassing the hopper. A suitably mounted motor 70, reversible in direction, driving screws 71 and 72 in threadable engagement with the hopper 61, provides means for moving the hopper between its loading position (solid lines) and its discharge position (dash lines). In its discharge position, discharge aperture 66 in the hopper is aligned with a discharge port 75 in the gas dome wall. A sealing plate 76 formed in gas dome 16 abuts the top wall 64 of the elevated hopper. Sealing plate 76 has an aperture 77 therein aligning with passage 69 and through which gas pipe 14a and screws 71 and 72 extend. Sealing plate 76 additionally has gas apertures 78 therein which do not align with the aperture 67 in the top wall 64 of the hopper, and thereby plate 76 provides means for sealing the hopper and preventing gas from blowing through the discharge port 75. To facilitate cleaning the hopper, a port 79 may be provided in gas dome wall 60 adjacent a hopper aperture 65 to admit water or other liquid to clean the hopper.

When the hopper is in its loading position, gas and scum travel through aperture 65 into the hopper, the gas continuing upwardly through apertures 67, and then through apertures 77 and 78 into the open end of gas pipe 14a. When the hopper is in its discharge position, it is desirable that there be means bypassing the hopper so that gas pressure will not build up to an undesirable level beneath the hopper. This bypass may be provided by sealing plate aperture 77 and passage 69 between the hopper inner wall 68 and the pipe 14a, or it can be provided by a separate conduit communicating with the gas dome both above and below the hopper.

Preferably the hopper and gas dome are made of Fiberglas, which is highly spark-resistant and unlikely to cause explosion, and also resistant to corrosion. Instead of screws 71 and 72, other means for moving the hopper, such as hydraulic devices or winches, can be used.

To assist the channels 58 in promoting the flow of scum toward the gas dome for collection, and concomitantly to agitate the scum layer, a gas recirculation means having a compressor 80 takes collected gas and forces it through conduits 81 to nozzles 82 extending into the scum layer beneath one or more of the shells 20 (FIG. 2). The nozzles 82 are directed centrally toward the gas dome so that injected gas will impel scum along the channels 58 to the collecting station.

If desired, one or more of the hollow shells 20 can be readily sealed and be used for gas storage, either to supply the compressor 80 or to provide the sewage treatment plant with a supplement or alternative to its regular storage facilities.

It should be understood that the foregoing description is for the purpose of illustration, and that the invention includes all modifications within the scope of the appended claims.

I claim:

1. A floating cover for a liquid tank comprising a plurality of substantially wedge-shaped, hollow shells disposed radially and joined together rigidly, each shell comprising:

a substantially sector-shaped top wall;
   a substantially sector-shaped bottom wall;
   an outer wall connecting with said top and bottom walls;
   side walls connecting with the top, bottom and outer walls and adapted for attachment to the side walls of adjacent shells;
   the walls of each of said hollow shells forming a lower liquid-displacing portion providing, when empty, sufficient buoyancy to enable the shell to float on said liquid independently, and an upper portion to trap air and enable said cover to float if buoyancy of the lower portion is lost by flooding with liquid.

2. A floating cover according to claim 1 further comprising:

a lip on each shell at the intersection of a side wall and bottom wall adapted to abut the bottom wall of an adjacent shell, whereby said shells may be aligned with said lips during assembly, and whereby materials in the tank is prevented from entering between adjacent side walls.

3. A floating cover according to claim 1 wherein the bottom walls of said shells incline upwardly toward the center of the cover, said bottom, side and outer walls of said shells forming internal separate compartments at the periphery of the cover capable of holding ballasting liquid, whereby the cover may be ballasted with liquid at least in some of said compartments to vary the buoyancy of the hollow shells and whereby liquid ballast may be transferred among said compartments to level said cover.

4. A floating cover according to claim 3 further comprising baffle plates extending between the side walls of said shells to restrict flow of liquid from said compartments toward the center of said cover, said baffle plates having check valves therein permitting liquid to flow to the lower parts of said compartments at the periphery of said cover.

5. A floating cover according to claim 3 further comprising valve means in said liquid holding compartments for purging ballast from said compartments when said floating cover is unsupported by buoyant contents therebeneath.

6. A floating cover according to claim 3 further comprising means for changing the quantity of liquid ballast in said liquid holding compartment, said means including pump and conduit means communicating with at least some of said compartments to introduce or remove liquid ballast.

7. A floating cover according to claim 1 further comprising:
a gas dome located centrally in the cover;
each shell having an inner wall shaped to conform to the gas dome and connecting with said top, bottom and side walls of the shell;
the bottom walls of the shells inclining upwardly toward said gas dome, whereby gas rising in said tank is directed by said bottom walls toward said gas dome for collection.

8. A floating cover according to claim 7 wherein the bottom walls of said shells form a multiplicity of gas-directing channels extending toward the gas dome, said channels extending substantially radially from said gas dome to the cover outer periphery and narrowing in depth and width toward the gas dome.

9. A digester tank floating cover comprising:
means forming a bottom surface inclining upwardly toward a central location in the cover;
a gas dome in said central location; and
said bottom surface forming a multiplicity of gas-direction channels extending toward the gas dome, said channels extending substantially radially inwardly toward said gas dome and narrowing in depth and width toward the gas dome, whereby gas rising in said tank will flow in said channels and maintain them substantially clear of scum.

10. A digester tank floating cover comprising:
means forming a bottom wall inclining upwardly towards a central location;
a gas dome at said central location and having vertical walls and an open bottom;
means extending from the upper portion of said gas dome for removing collected gases;
a hopper vertically slidable in the gas dome and having a vertical outer wall mating with the gas dome wall and a bottom wall connecting with said outer wall, the outer wall having apertures for entry of scum and gases into said hopper and a discharge port located near said bottom wall;
means for moving said hopper from a lower, loading position in which scum and gases enter said hopper through said apertures, to an elevated discharge position in the gas dome, the gas dome being provided with a discharge port aligning with the discharge port of the hopper in its elevated position.

11. A floating cover according to claim 12 further comprising:
a top wall with gas ports therein on said hopper;
a sealing plate with gas ports therein non-coincident with the gas ports on said hopper top wall, said sealing plate being formed in said gas dome in a position to abut the hopper top wall in its elevated position; and
means providing a gas bypass across said hopper in its elevated position,
whereby gases are prevented by said sealing plate from discharging through said gas dome discharge port, and whereby gas flow to said means removing collected gases is unobstructed during scum discharge.

12. A floating cover according to claim 10 further comprising means for sealing said hopper discharge port in the lower position of the hopper and during elevation thereof.

13. A floating cover according to claim 10 wherein said bottom wall forms a multiplicity of gas-directing channels extending toward said gas dome, to promote flow of scum to said hopper.

14. A floating cover according to claim 10 further comprising means for injecting gas into scum beneath said upwardly inclining bottom wall and toward said gas dome, thereby promoting flow of scum to said hopper.

References Cited

UNITED STATES PATENTS

| | | | |
|---|---|---|---|
| 2,008,686 | 7/1935 | Day. | |
| 2,409,585 | 10/1946 | Piatt. | |
| 2,422,394 | 6/1947 | Carter. | |
| 2,768,136 | 10/1956 | Wright | 210—194 |
| 2,768,137 | 10/1956 | Schlenz et al. | |
| 3,176,845 | 4/1965 | Schenk | 210—150 |
| 3,288,295 | 11/1966 | Kelly | 210—194 |
| 3,298,670 | 1/1967 | Crom. | |
| 3,349,945 | 10/1967 | Baker | 220—26 |

SAMIH N. ZAHARNA, Primary Examiner

F. F. CALVETTI, Assistant Examiner

U.S. Cl. X.R.

210—194, 218, 242, 540; 220—26